US011913370B2

(12) United States Patent
Osmun et al.

(10) Patent No.: US 11,913,370 B2
(45) Date of Patent: Feb. 27, 2024

(54) VALVE ASSEMBLY FAILSAFE

(71) Applicant: Illinois Tool Works Inc., Glenview, IL (US)

(72) Inventors: Nathan Osmun, Edgerton, OH (US); Joseph Davis, Archbold, OH (US)

(73) Assignee: Illinois Tool Works Inc., Glenview, IL (US)

( * ) Notice: Subject to any disclaimer, the term of this patent is extended or adjusted under 35 U.S.C. 154(b) by 178 days.

(21) Appl. No.: 17/584,939

(22) Filed: Jan. 26, 2022

(65) Prior Publication Data

US 2022/0251997 A1 Aug. 11, 2022

Related U.S. Application Data

(60) Provisional application No. 63/168,068, filed on Mar. 30, 2021, provisional application No. 63/147,851, filed on Feb. 10, 2021.

(51) Int. Cl.
  *F01P 7/14* (2006.01)
  *F01P 7/16* (2006.01)
  (Continued)

(52) U.S. Cl.
  CPC ............... *F01P 7/16* (2013.01); *F16K 17/003* (2013.01); *F16K 17/38* (2013.01); *F16K 31/002* (2013.01); *F01P 2007/146* (2013.01)

(58) Field of Classification Search
  CPC .... F01P 2007/146; F01P 7/16; F01P 2031/00; F16K 17/38; F16K 31/53
  (Continued)

(56) References Cited

U.S. PATENT DOCUMENTS 4,289,038 A * 9/1981 Hore ..................... F16K 17/32
  74/2
6,681,805 B2 1/2004 McLane et al.
(Continued)

FOREIGN PATENT DOCUMENTS

EP 2943704 A1 11/2015
EP 3073161 A1 9/2016
(Continued)

OTHER PUBLICATIONS

International Search Report and Written Opinion from PCT/US2022/014051, dated May 24, 2022 (14 pages).

*Primary Examiner* — Long T Tran
*Assistant Examiner* — James J Kim
(74) *Attorney, Agent, or Firm* — Quarles & Brady LLP

(57) ABSTRACT

A valve assembly failsafe configured to be coupled to an actuator of a coolant control regulator assembly is provided. The valve assembly failsafe includes a wind arm, a spring that engages the wind arm under spring tension, a latch that engages the wind arm, a drive gear that engages the wind arm and the actuator, and a driver that engages the latch. The valve assembly failsafe is configured to be positioned in a set state where the latch engages and retains the wind arm under spring tension and the drive gear freely rotates during rotation of the actuator, and a tripped state where the driver rotates the latch to disengage the latch from the wind arm, causing the wind arm to rotate under the spring tension to engage the drive gear and cause the drive gear to drive the actuator to a default position.

18 Claims, 6 Drawing Sheets

(51) Int. Cl.
  *F16K 17/00* (2006.01)
  *F16K 31/00* (2006.01)
  *F16K 17/38* (2006.01)
(58) Field of Classification Search
  USPC .................................................... 123/41.09
  See application file for complete search history.

(56) References Cited

U.S. PATENT DOCUMENTS

| | | | |
|---|---|---|---|
| 7,665,714 B2* | 2/2010 | Stumbo | F16K 31/563 251/71 |
| 7,963,455 B2 | 6/2011 | Heldberg et al. | |
| 8,435,148 B2 | 5/2013 | Moorman | |
| 8,500,600 B2 | 8/2013 | Moorman | |
| 9,032,915 B2 | 5/2015 | Tobergte et al. | |
| 9,212,751 B2 | 12/2015 | Ealy | |
| 9,827,824 B2 | 11/2017 | Enomoto | |
| 9,879,794 B2* | 1/2018 | Atschreiter | F16K 17/386 |
| 9,951,878 B2 | 4/2018 | Heldberg | |
| 10,119,451 B2 | 11/2018 | Seeger | |
| 10,125,878 B2 | 11/2018 | Bartonek | |
| 10,280,829 B2 | 5/2019 | Shen et al. | |
| 10,344,877 B2 | 7/2019 | Roche et al. | |
| 10,401,051 B2* | 9/2019 | Chopra | F24F 13/10 |
| 10,665,908 B2 | 5/2020 | Krull et al. | |
| 2004/0026175 A1 | 2/2004 | Oh et al. | |
| 2005/0034688 A1* | 2/2005 | Lelkes | F16K 11/074 123/41.01 |
| 2006/0118066 A1 | 6/2006 | Martins | |
| 2015/0000327 A1 | 1/2015 | Kakehashi et al. | |
| 2016/0273671 A1* | 9/2016 | Chang | F16K 17/38 |
| 2017/0335749 A1* | 11/2017 | Maruyama | F01P 7/16 |
| 2018/0263180 A1 | 9/2018 | Schlipf et al. | |
| 2019/0070924 A1 | 3/2019 | Mancini et al. | |
| 2019/0368621 A1 | 12/2019 | Marchand | |
| 2019/0383201 A1* | 12/2019 | Lee | F01P 11/16 |
| 2020/0132204 A1 | 4/2020 | Krost et al. | |
| 2020/0171914 A1 | 6/2020 | Han et al. | |
| 2020/0253110 A1 | 8/2020 | Schlipf et al. | |
| 2020/0253111 A1 | 8/2020 | Schlipf et al. | |
| 2020/0393053 A1 | 12/2020 | Dragojlov et al. | |
| 2021/0381422 A1 | 12/2021 | Osmun et al. | |

FOREIGN PATENT DOCUMENTS

| | | |
|---|---|---|
| GB | 2328492 A | 2/1999 |
| WO | 2016045895 A1 | 3/2016 |
| WO | 2016194502 A1 | 12/2016 |
| WO | 2017058616 A1 | 4/2017 |
| WO | 2019011617 A1 | 1/2019 |
| WO | 2020018340 A1 | 1/2020 |
| WO | 2020186589 A1 | 9/2020 |

* cited by examiner

VALVE ASSEMBLY FAILSAFE

CROSS REFERENCE TO RELATED APPLICATIONS

This application claims the benefit of, and priority from, U.S. Provisional Application No. 63/168,068 filed Mar. 30, 2021, and U.S. Provisional Application No. 63/147,851 filed Feb. 10, 2021, both of which are hereby incorporated by reference in their entirety.

BACKGROUND OF THE INVENTION

1. Field of the Invention

The present invention relates generally to a coolant control regulator and, more particularly, to a valve assembly failsafe for a coolant control regulator valve assembly.

2. Description of the Background of the Invention

Coolant control regulators or valves are used in coolant circuits of vehicles, such as cars or trucks, for cooling or heating an internal combustion engine or battery. It is known in the art to arrange a coolant control valve to regulate the coolant through the vehicle. Some coolant control regulators can include a ball valve with one or more seals that create open and closed sections on the ball valve at a specific rotation.

If there is a failure of the valve control, it would be desirable to position the valve to a default or "safe" position, for example, that ensures fluid flow to certain components in order to avoid larger or more complicated vehicle system failures. Therefore, a need exists for a coolant control valve failsafe device and methods.

SUMMARY OF THE INVENTION

In one aspect, a valve assembly failsafe configured to be coupled to an actuator of a coolant control regulator assembly is provided. The valve assembly failsafe includes a wind arm, a spring that engages the wind arm under spring tension, a latch that engages the wind arm, a drive gear that engages the wind arm and the actuator, and a driver that engages the latch. The valve assembly failsafe is configured to be positioned in a set state where the latch engages and retains the wind arm under spring tension and the drive gear freely rotates during rotation of the actuator, and a tripped state where the driver rotates the latch to disengage the latch from the wind arm, causing the wind arm to rotate under the spring tension to engage the drive gear and cause the drive gear to drive the actuator to a default position.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

FIG. 10A is an underside view of the valve assembly failsafe in the set mode, FIG. 10B is an underside view of the valve assembly failsafe at a beginning of a tripped mode, FIG. 10C is an underside view of the valve assembly failsafe at an end of the tripped mode, and FIG. 10D is a topside view of the valve assembly failsafe at the end of the tripped mode.

Figure 1:
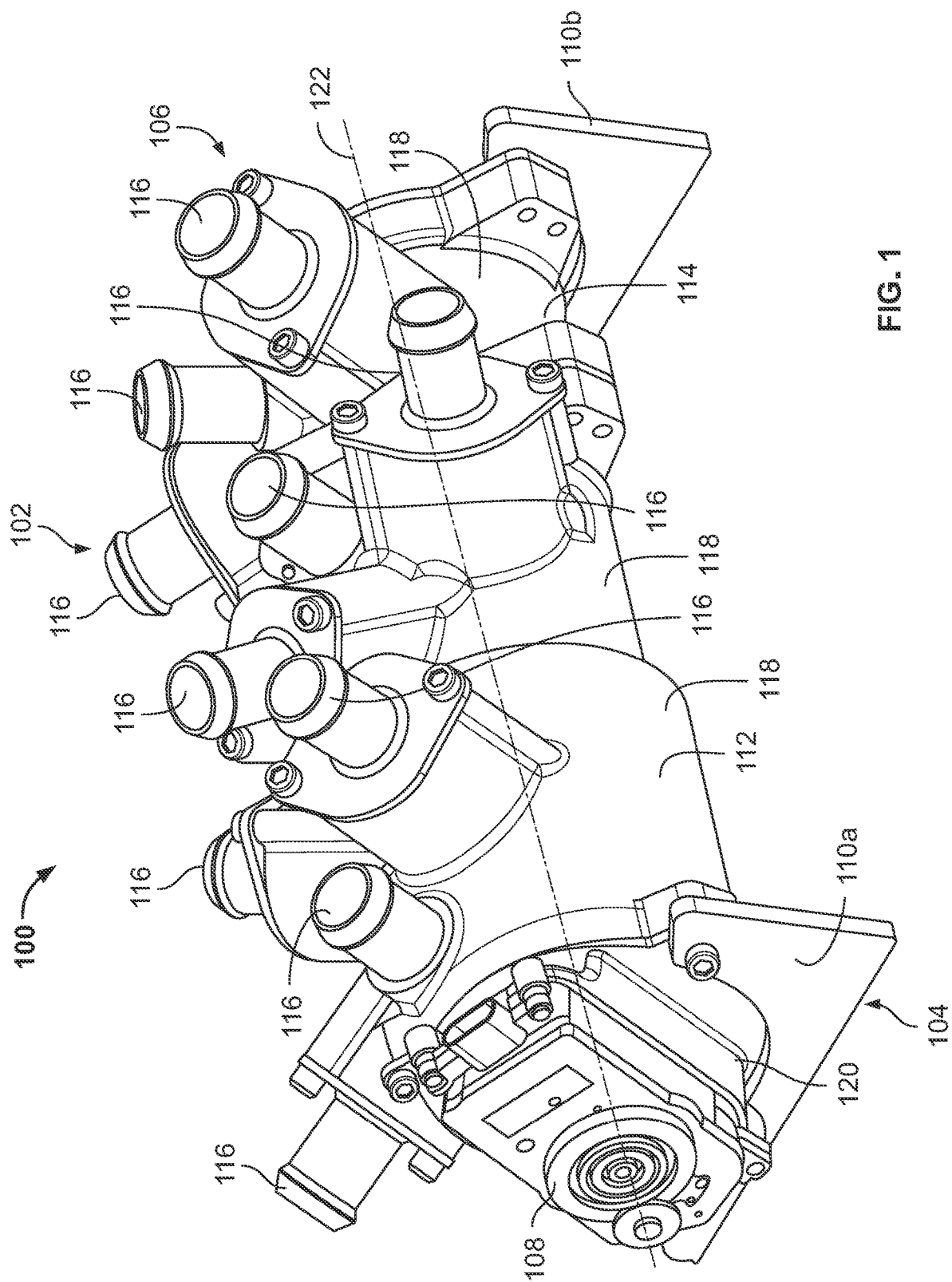
FIG. 1 is an isometric view of a coolant control ball valve assembly.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Embodiments of the present disclosure provide for a coolant control regulator or coolant control ball valve assembly comprising a ball valve with a plurality of sealing or flow possibilities. Specifically, the ball valve comprises multiple sealing and flow openings/apertures that can be shared on the same spherical ball valve surface. As a result of the ball valve, the coolant control regulator can increase the cooling/heating mode capacity and control multiple control circuits.

FIG. 1 illustrates a coolant control ball valve assembly or coolant control regulator assembly 100 for a cooling system of a vehicle, such as a passenger motor vehicle or a truck. The control valve assembly 100 may be used in any type of engine or vehicle system, such as in a vehicle internal combustion engine, or part of a hybrid or fully electric vehicle. For example, the control valve assembly 100 may be arranged in an auxiliary circuit of such a cooling system. Further, the control valve assembly 100 may be part of an auxiliary circuit coolant control system, such as in line with the transmission or a vehicle cabin heating system. It is contemplated that the control valve assembly 100 may be connected to any type or number of fluid circuit systems in the vehicle to cool and/or heat any portion of the vehicle.

Referring still to FIG. 1, generally, the control valve assembly 100 comprises a valve body 102, a first end 104, a second end 106, and an actuator 108. The valve assembly 100 may be supported by one or more supports 110, such as supports 110a and 110b coupled to the first end 104 and the second end 106, respectively. The valve body 102 can comprise one or more sleeves, 112, 114 connected to each other in any known manner. Further, the first and second sleeves 112, 114 include a plurality of ports 116 (such as inlet or outlet ports) positioned circumferentially around the sleeves 112, 114. Furthermore, in some embodiments, each of the first and second sleeves 112, 114 can include one or more modular housings 118. For example, as shown in FIG. 1, the first sleeve 112 includes two housings 118 and the second sleeve includes one housing 118. It should be noted, however, that the control valve assembly 100 may include more or fewer sleeves 112, 114, more or fewer ports 116, and/or more or fewer housings 118 than illustrated. For example, in some applications, the control valve assembly 100 can include a single sleeve 112 comprising multiple modular housings 118, or two or more sleeves 112, 114 comprising two or more connected modular housings 118.

Within each sleeve 112, 114, the control valve assembly 100 can include one or more ball valves (not shown). More specifically, in some embodiments, each modular housing 118 of a respective sleeve 112, 114 includes an internal cavity with a ball valve positioned therein. For example, the first sleeve 112 can include two modular housings 118, containing a first ball valve and a second ball valve, respectively, and the second sleeve 114 can include another housing 118, containing a third ball valve therein. Each of the ball valves includes a plurality of apertures that can align with the plurality of ports 116, based on a position of the ball valve, to direct fluid into and out of the valve body 102 and, thus, throughout the vehicle. Generally, all of the ball valves may be substantially similar to each other except for the placement of the plurality of apertures.

Referring still to FIG. 1, the actuator 108 can be positioned at the first end 104 or the second end 106. For example, the actuator 108 can be coupled to the first sleeve 112 at the first end 104 via an actuator end cover 120. However, although the actuator 108 is illustrated on the first end 104 in FIG. 1, it is contemplated that the actuator 108 may be positioned on either end of the control valve assembly 100. The actuator 108 can be coupled to the internal ball valves through the actuator end cover 120, and operates to rotate the ball valves to align the apertures of the ball valves with particular ports 116. That is, a motor (not shown) can drive the actuator 108 to rotate the ball valves about a valve axis 122 within the sleeves 112, 114. It is contemplated that the actuator 108 is connected to each of the ball valves in any conventional manner. For example, in some embodiments, a rod may extend through each of the ball valves and connect with the actuator 108. In alternative embodiments, all of the ball valves may be attached to each other such that the actuator 108 only needs to turn one of the ball valves to rotate all of the ball valves. Furthermore, any type of motor or device may be used to drive the actuator 108, such as a DC motor, a wax motor, a vacuum motor, etc.

A valve control (not shown) can operate the motor and, thus, the actuator 108, to rotate the ball valves to a specific position so that, one or more ports 116 (such as inlet ports) are fluidly connected to one or more other ports 116 (such as outlet ports). The ports 116 can be further fluidly connected to various components within the vehicle system. As a result, by orienting the ball valves in a specific position via the actuator 108, the control valve assembly 100 can control fluid flow to and from the various components of the vehicle.

If the valve control fails, such as due to power loss, signal loss, or actuator failure, or another reason, it would be desirable to position the valve assembly 100 to a default position. That is, in the event of valve control failure, it would be desirable to position the ball valves within the valve assembly 100 to a default position so that fluid flow is maintained between certain connected components.

Accordingly, FIGS. 2-10 illustrate a valve assembly failsafe 130 according to some embodiments. Generally, the valve assembly failsafe 130 can be coupled to the control valve assembly 100 and, when provided with a signal indicative of valve control failure, can automatically rotate the valve control assembly 100 to the default position. That is, in some embodiments, the valve assembly failsafe 130 can be a "bolt-on" device with an electrical connector that can receive a signal indicative of valve control failure, and a drive piece that engages drive features of the actuator 108 to set the control valve assembly 100 to the default position when such a signal is received.

Figure 2:
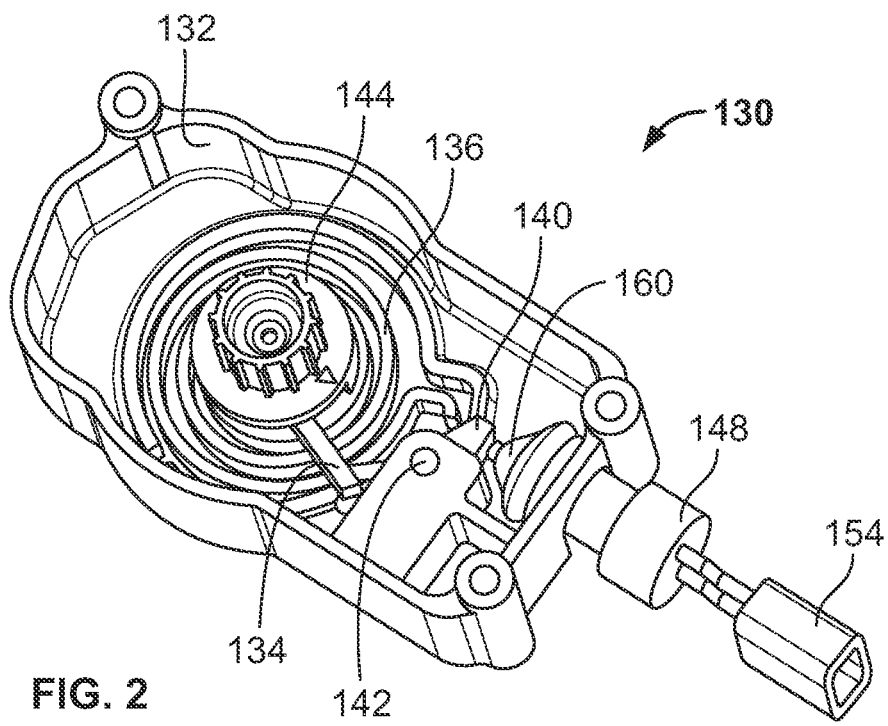
FIG. 2 is an isometric view of a valve assembly failsafe, according to some embodiments.
Figure 3:
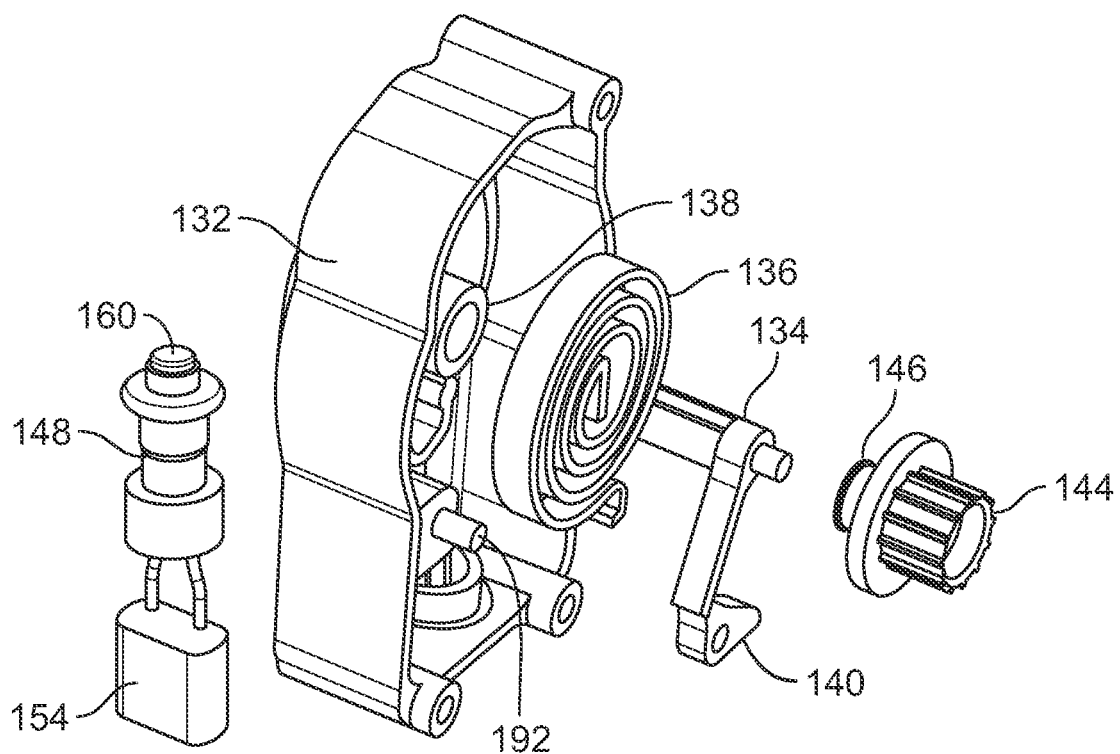
FIG. 3 is an isometric exploded view of the valve assembly failsafe of FIG. 2.
Figure 4:
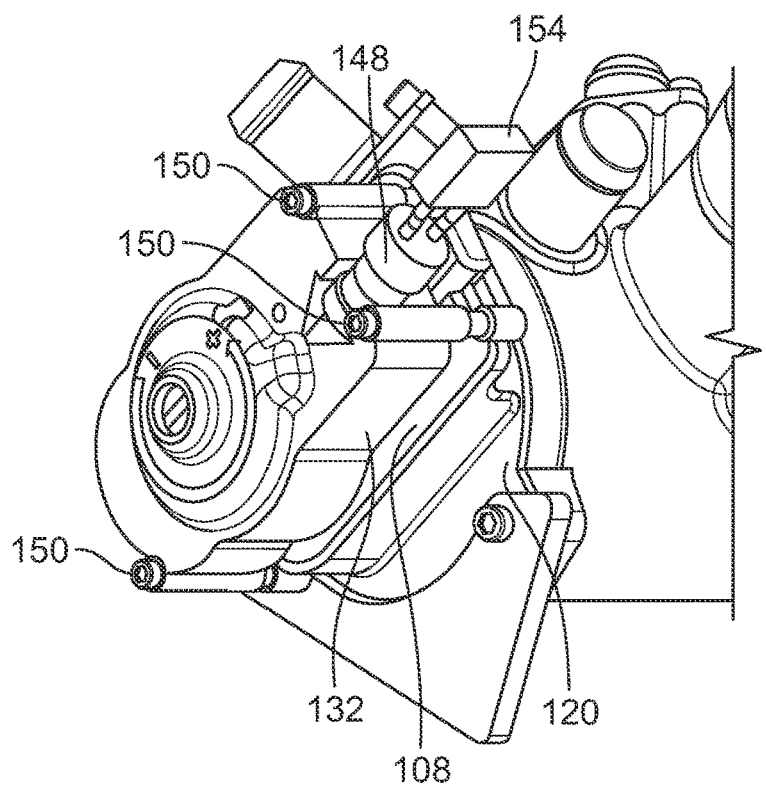
FIG. 4 is a partial isometric view of the valve assembly failsafe of FIG. 2 coupled to the coolant control ball valve assembly of FIG. 1.
Figure 5:
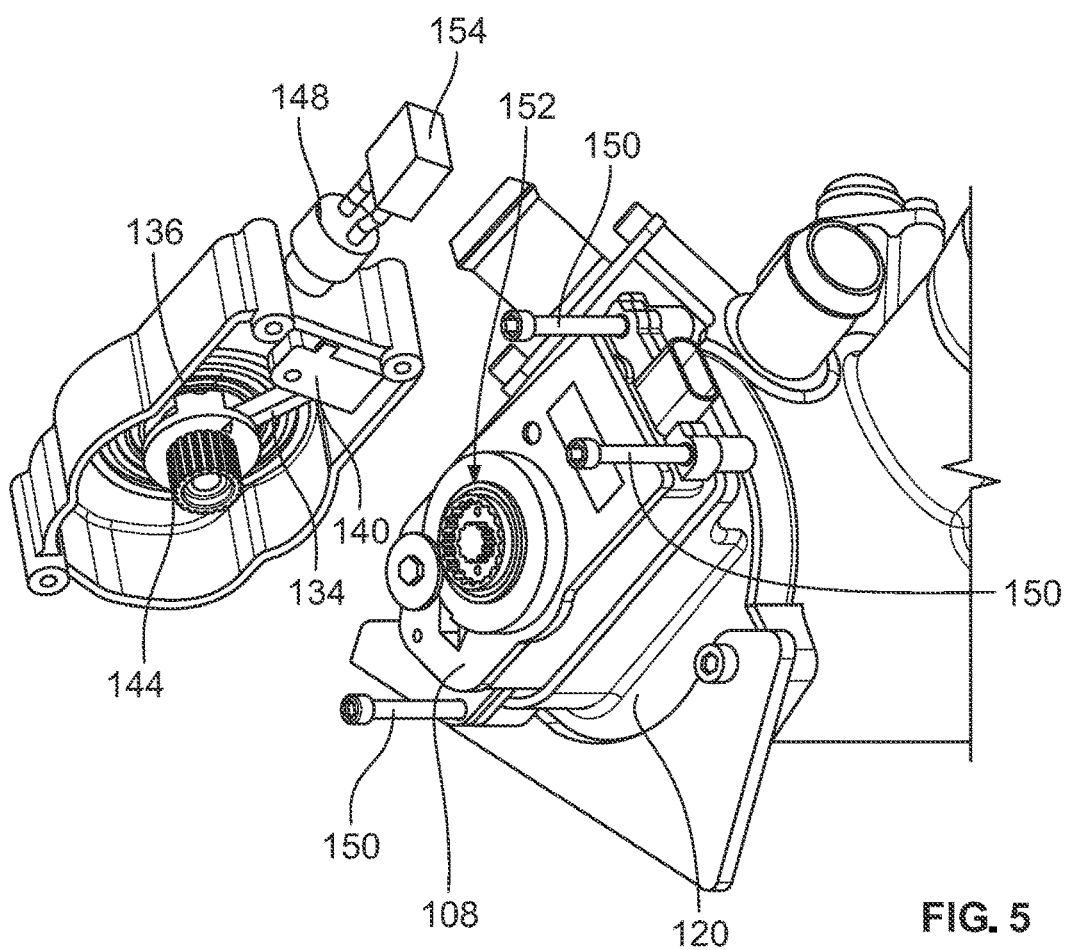
FIG. 5 is a partial isometric view of the valve assembly failsafe of FIG. 2 and the coolant control ball valve assembly of FIG. 1 in an uncoupled state.

As shown in FIGS. 2-5, the valve assembly failsafe 130 can include a housing 132, a wind arm 134, a spring 136, a wind arm bearing 138 (see FIG. 3), a latch 140 (see FIGS. 2 and 3), a latch pin 142, a drive gear 144 (see FIGS. 2, 3, and 5), a drive gear bushing 146 (see FIG. 3), and a wax driver 148 (see FIGS. 2-5). The valve assembly failsafe 130 and, more specifically, the housing 132, can be coupled to (e.g., bolted onto) the actuator 108 and/or the actuator end cover 120 via one or more fasteners 150, such as bolts, as shown in FIGS. 4 and 5. The valve assembly failsafe 130 can generally cover the actuator 108 so that the drive gear 144 engages a drive interface 152 of the actuator 108 (see FIG. 5).

As such, the housing 132 can generally hold the other components of the valve assembly failsafe 130 and permits mounting of the valve assembly failsafe 130 to the actuator 108.

Turning to FIGS. 2 and 3, the wind arm 134 engages the spring 136, which can provide drive power to rotate the actuator 108 and the valve assembly 100 to the default position. For example, when the wind arm 134 is released, the spring rotates the wind arm 134 when in a "tripped" or "failsafe" mode where it can rotate the actuator 108 and, thus, the valve assembly, to the default position. The wind arm bearing 138 can support a spring end of the wind arm 134. The latch 140 can hold the wind arm 134 in place in a "set" mode, and can release the wind arm 134 into the tripped mode. The latch pin 142 can support the latch 140 so that the latch 140 pivots about the latch pin 142.

As noted above, and as shown in FIG. 5, the drive gear 144 interfaces with the actuator drive interface 152. With reference again to FIGS. 2 and 3, the drive gear 144 can further be engaged with the wind arm 134 and, as discussed further below, can rotate with the actuator 108 when the valve assembly failsafe 130 is in the set mode, and drive the actuator 108 when the valve assembly failsafe 130 is in the tripped mode (e.g., to the default position). The drive gear bushing 146 can support the drive gear 144 on the wind arm 134 (see FIG. 3). The wax driver 148 can trip the latch 140 to release the wind arm 134 into the tripped mode. Furthermore, the wax driver 148 can include an electrical connector 154, for example, that can be coupled to the valve control or another component to receive an electric signal indicative of valve control failure.

Figure 6:
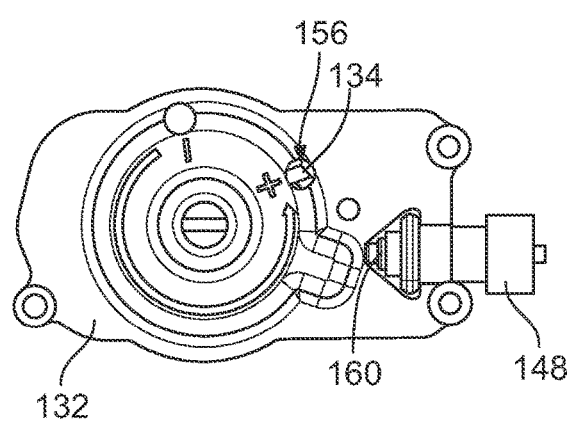
FIG. 6 is a topside view of the valve assembly failsafe of FIG. 2.
Figure 7:
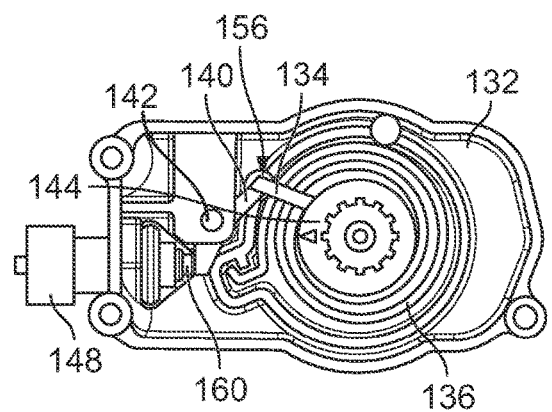
FIG. 7 is an underside view of the valve assembly failsafe of FIG. 2.
Figure 8:
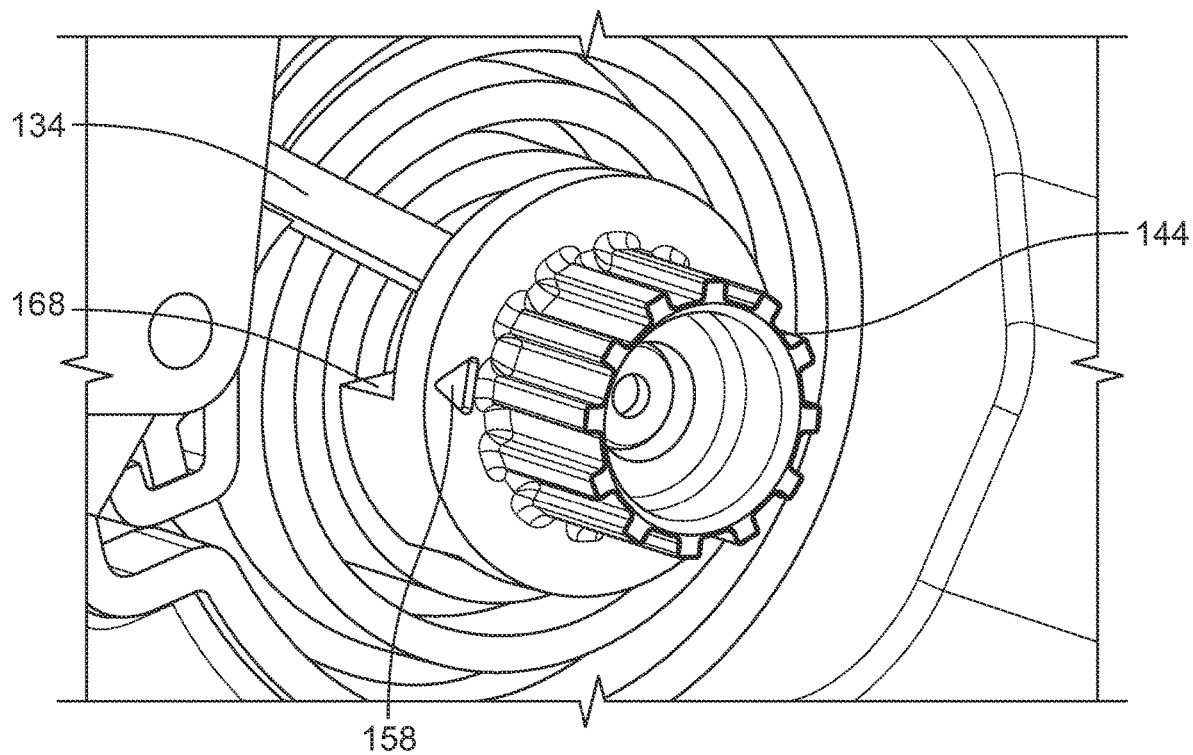
FIG. 8 is a partial underside view of a drive gear of the valve assembly failsafe of FIG. 2 in a first position.
Figure 9:
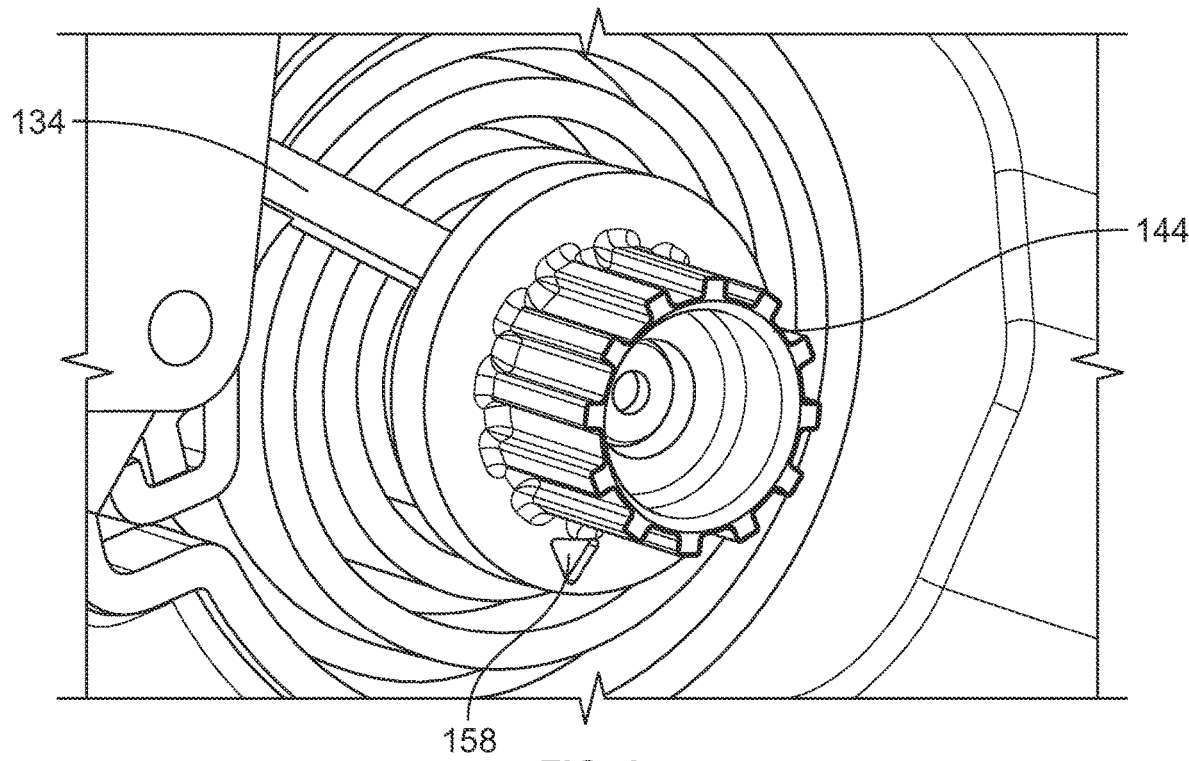
FIG. 9 is a partial underside view of the drive gear of the valve assembly failsafe of FIG. 2 in a second position.

During normal operation of the control valve assembly 100, the valve assembly failsafe 130 can be in the set mode. In the set mode, the spring 136 has been tightened by winding the wind arm 134 until the wind arm 134 engages with the latch 140. More specifically, as shown in FIGS. 6 and 7, when in the set mode, the wind arm 134 is wound to a position so that it is positioned adjacent and viewable through a first aperture 156 in the housing 132. As a result, in this set mode, the wind arm 134 is under spring tension but held in place by the latch 140. Furthermore, in this set mode, the drive gear 144 does not engage the wind arm 134 and is free to rotate with the actuator 108. That is, as shown in FIGS. 8 and 9, the drive gear 144 can include notch 168 (indicated at arrow 158) that does not engage the wind arm 134 while in the set mode. As a result, the drive gear 144 may be free to rotate, for example, to a first position shown in FIG. 8 and a second position shown in FIG. 9, as the actuator 108 moves to such positions, while the notch 168 remains disengaged from the wind arm 134.

Figure 10A:
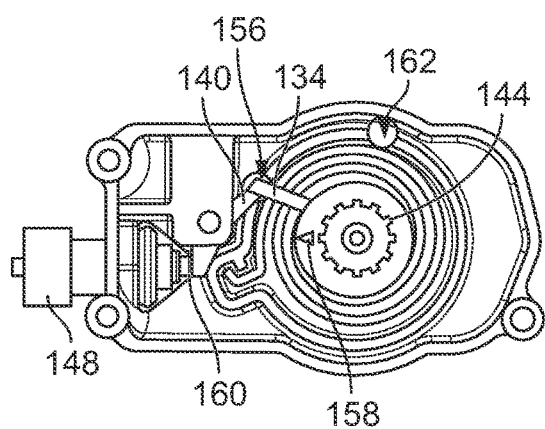
FIGS. 10A-10D are views of the valve assembly failsafe of FIG. 2 moving from a set mode to a tripped mode, where
Figure 10B:
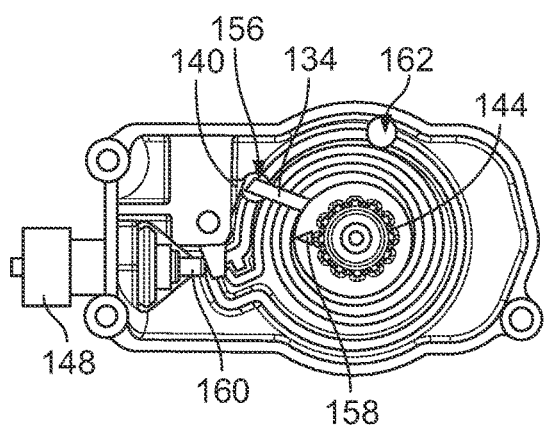
Figure 10C:
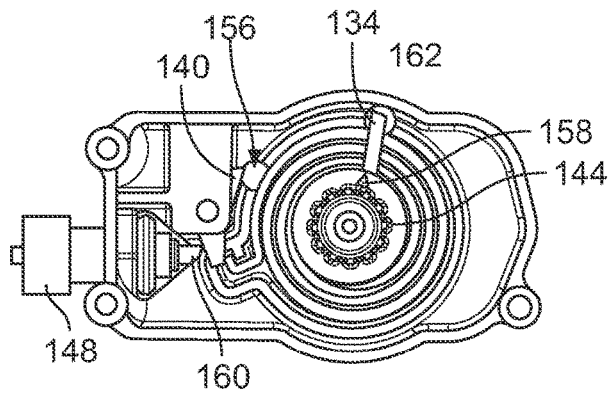
Figure 10D:
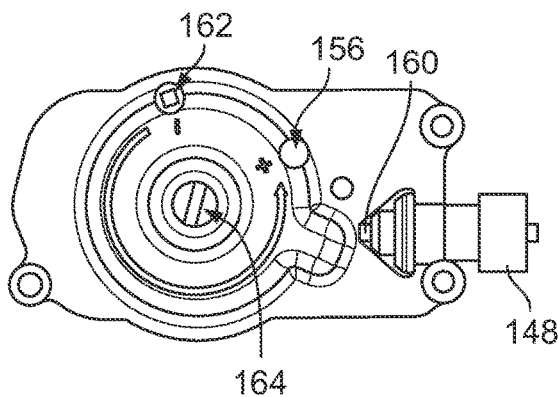

Turning to FIGS. 10A-10D, upon a failure condition, an electric signal (e.g., current) is sent to the wax driver 148. The wax driver may comprise a heating element, which heats the wax of the wax driver upon reception of the electronic signal. This causes wax of the wax driver 148 to heat and, in turn, reversibly expand. Put another way, when the wax of the wax driver 148 is heated, the wax expands. However, when the wax cools the wax contracts back to substantially the same size and shape as before it was heated. In an embodiment, the wax of the wax driver 148 remains substantially unmelted during and after heating. When the wax expands, a pin 160 of the wax driver 148 is driven from a first position, shown in FIG. 10A (while in a set mode) outward to a second position shown in FIG. 10B (triggering the tripped mode). As the pin 160 extends outward, it pushes on the latch 140, causing the latch 140 to rotate. As shown in FIG. 10B, when the latch 140 rotates, it releases the wind arm 134. The released wind arm 134, under spring tension, then rotates until it makes contact with the drive gear 144 (e.g., a portion of the wind arm 134 makes contact with the notch 168, as indicated by arrow 158 in FIGS. 10A-10C, of the drive gear 144). When the wind arm 134 contacts the drive gear 144, it continues to rotate (i.e., due to spring tension) and, as a result, communicates spring tension to the drive gear 144 and rotates the drive gear 144 which, in turn, communicates spring tension to the actuator 108 and rotates the actuator 108 and the ball valves. The wind arm 134 may continue to rotate until spring tension is released, at which point the wind arm 134 and, in turn, the drive gear 144 and the actuator 108, are at the default position, as shown in FIGS. 10C and 10D. Alternatively, the coolant control regulator assembly may have an internal hard-stop that is configured to place the coolant control regulator assembly in the default position, and the wind arm 134 may continue to rotate until the actuator 108 encounters the hard-stop. Furthermore, as shown in FIGS. 10C and 10D, when the wind arm 134 reaches the default position, the wind arm 134 is adjacent and viewable through a second aperture 162 of the housing 132.

Figure 11:
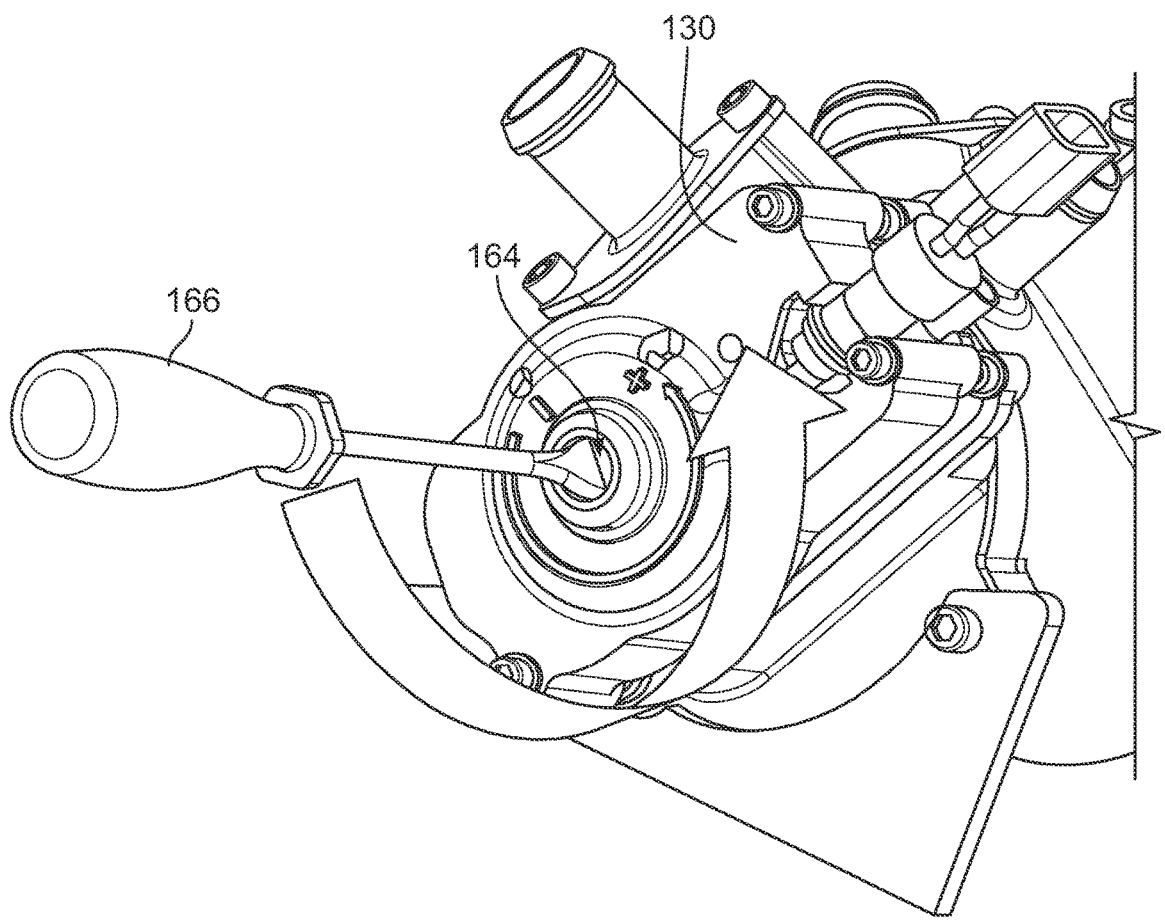
FIG. 11 is a partial isometric view of the valve assembly failsafe of FIG. 2 coupled to the coolant control ball valve assembly of FIG. 1, wherein the valve assembly failsafe is engaged by a tool.

When the vehicle has been repaired or serviced so that the valve control assembly may be used again outside of the default position, the valve failsafe 130 can be reset. More specifically, as shown in FIG. 11, the wind arm 134 includes a portion that can be engaged from outside the housing 132 through a reset aperture 164 (said portion of the wind arm 134 being referred to as a reset interface), e.g., via a tool 166 such as a screwdriver. The tool can engage the reset interface of the wind arm 134 to rotate the wind arm 134 back to the set position, thus again placing the wind arm 134 under spring tension and engaged with the latch. For example, a user can engage the wind arm 134 with the tool and rotate the wind arm 134 so that it is again viewable through the first aperture. In some embodiments, by rotating the wind arm 134 back in place to the set mode, the pin of the wax driver can be forced back inward so that it no longer pushes against the latch. Alternatively, in some embodiments, the wax driver may be replaced.

While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain how to practice the disclosure and will enable others skilled in the art to utilize the disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

We claim:

1. A valve assembly failsafe configured to be coupled to an actuator of a coolant control regulator assembly, the valve assembly failsafe comprising:
   a housing;
   a spring positioned within the housing and configured to be under spring tension;
   a wind arm that engages the spring;
   a latch that engages the wind arm;
   a driver that engages the latch; and
   a drive gear configured to engage the actuator of the coolant control regulator assembly,
   wherein the wind arm comprises a wind arm bearing at a spring-end of the wind arm that engages and supports the spring,
   wherein the drive gear is mounted on the wind arm, and
   wherein the valve assembly failsafe is configured to be positioned in a state selected from the group of states consisting of:
      a set state, wherein the latch engages and retains the wind arm, the wind arm does not engage the drive gear, and the drive gear freely rotates during rotation of the actuator, and
      a tripped state, wherein the wind arm is disengaged from the latch and engages the drive gear.

2. The valve assembly failsafe of claim 1, wherein the drive gear comprises a notch, and
   wherein a portion of the wind arm is configured to engage the notch of the drive gear when the valve assembly failsafe is in the tripped state, and wherein the spring is configured to be in communication with the drive gear via the engagement between the wind arm and the notch.

3. The valve assembly failsafe of claim 2, wherein the spring is configured to cause the drive gear to drive the actuator to a default position when the valve assembly failsafe is in the tripped state.

4. The valve assembly failsafe of claim 1 further comprising an electrical connector, and
wherein valve assembly failsafe is configured to receive an electrical signal via the electrical connector.

5. The valve assembly failsafe of claim 4, wherein the driver is a wax driver.

6. The valve assembly failsafe of claim 5, wherein the wax driver comprises a heating element, and
wherein the heating element is configured to heat the wax driver upon reception of the electrical signal.

7. The valve assembly failsafe of claim 6, wherein the wax driver is configured to reversibly expand when heated.

8. The valve assembly failsafe of claim 7, wherein the wax driver is configured to expand without melting when heated by the heating element.

9. The valve assembly failsafe of claim 7, wherein the wax driver comprises a pin,
wherein the pin is configured to be in a first position before the wax driver is heated and to move to a second position when the wax driver is heated.

10. The valve assembly failsafe of claim 9, wherein the pin of the wax driver is configured to engage and rotate the latch when the pin is in the second position, and
wherein the latch is configured to disengage from the wind arm when rotated by the pin.

11. The valve assembly failsafe of claim 10, wherein the valve assembly failsafe is in the set state before the wax driver is heated, and
wherein the valve assembly failsafe is in the tripped state when wax driver is heated.

12. A valve assembly failsafe configured to be coupled to an actuator of a coolant control regulator assembly, the valve assembly failsafe comprising:
a housing comprising a reset aperture;
an electrical connector linked to the housing;
a spring positioned within the housing;
a wind arm that engages the spring and comprises a reset interface;
a latch that engages the wind arm;
a driver that engages the latch; and
a drive gear configured to engage the actuator of the coolant control regulator assembly,
wherein the valve assembly failsafe is configured to be transitioned from a set state in which the wind arm and the spring are under spring tension, to a tripped state in which the spring is unloaded such that the wind arm engages and rotates the drive gear,
wherein the valve assembly failsafe is configured to be transitioned from the tripped state back to the set state, and
wherein the reset interface of the wind arm is positioned within the reset aperture.

13. The valve assembly failsafe of claim 12, wherein the valve assembly failsafe is configured to automatically transition from the set state to the tripped state upon reception of an electronic signal by the electrical connector, and
wherein the valve assembly failsafe is configured to transition back from the tripped state to the set state via rotation of the reset interface.

14. The valve assembly failsafe of claim 13, wherein the housing further comprises a first aperture and a second aperture, and
wherein the wind arm is viewable through a first aperture when the valve assembly failsafe is in the set state and is viewable through a second aperture when the valve assembly failsafe is in the tripped state.

15. The valve assembly failsafe of claim 12, wherein the driver is a wax driver and comprises a pin and a heating element,
wherein the pin is in a first position when the valve assembly failsafe is in the set state and is in a second position when the valve assembly failsafe is in the tripped state,
wherein the heating element is configured to heat the wax driver and the wax driver is configured to expand when heated,
wherein the pin is configured to move from the first position to the second position when the wax driver expands, and
wherein the pin is configured such that the pin can be moved back to the first position when the wax driver is cooled.

16. A coolant control regulator assembly, comprising:
a housing;
an actuator coupled to the housing and having a hard-stop;
a plurality of ports extending from the housing;
a plurality of ball valves positioned within the housing, each ball valve connected to one or more of the ports; and
a valve assembly failsafe mounted on the actuator and comprising:
a spring configured to be under spring tension;
a wind arm that engages the spring;
a latch that engages the wind arm;
a driver that engages the latch; and
a drive gear configured to engage the actuator of the coolant control regulator assembly,
wherein the valve assembly fail safe is configured to be positioned in a state selected from the group of states consisting of:
a set state, wherein the latch engages and retains the wind arm, the wind arm does not engage the drive gear, and the drive gear freely rotates during rotation of the actuator, and
a tripped state, wherein the wind arm is disengaged from the latch and engages the drive gear,
wherein the hard stop is configured to hold the actuator in a default position, and
wherein the spring tension is sufficient to cause the drive gear to drive the actuator to the default position, when the valve assembly failsafe is in the tripped state.

17. The coolant control regulator assembly of claim 16, wherein an electronic signal is sent to the driver upon a failure condition of the coolant control regulator assembly.

18. The coolant control regulator assembly of claim 16, wherein the hard-stop is configured such that when the actuator is in the default position, the plurality of ball valves cooperate to provide fluid flow through a predetermined set of ports to a predetermined component.

* * * * *